(12) United States Patent  (10) Patent No.: US 6,384,930 B1
Ando  (45) Date of Patent: May 7, 2002

(54) PRINTER CONTROL CIRCUIT, PRINTER AND PRINT SYSTEM

(75) Inventor: Hirofumi Ando, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/273,730

(22) Filed: Mar. 22, 1999

(30) Foreign Application Priority Data

Mar. 25, 1998 (JP) ............................................. 10-77882
Feb. 3, 1999 (JP) ........................................... 11-025764

(51) Int. Cl.⁷ ............................................. G06K 15/00
(52) U.S. Cl. ....................................... 358/1.17; 358/1.9
(58) Field of Search ........................... 358/1.1, 1.2, 1.9, 358/500, 1.16, 1.17, 523, 534–536, 296–300; 345/589, 600, 596, 601, 602, 603, 604, 605, 549, 550, 568

(56) References Cited

U.S. PATENT DOCUMENTS 4,974,171 A * 11/1990 Yeh et al. ................... 358/1.13
6,049,394 A * 4/2000 Fukushima ................. 358/1.15

* cited by examiner

*Primary Examiner*—Arthur G. Evans
(74) *Attorney, Agent, or Firm*—Sughrue Mion, PLLC

(57) ABSTRACT

A printer-control-only hardware circuit (control circuit) is interposed between a printer driver of a host computer and a printer. The printer driver transmits to the control circuit a series of control circuit commands for use with the control circuit. The series of control circuit commands include several types of commands, such as a backend parameter setting command used for sending a backend parameter which is required for resetting the printer and an RGB data transmission command for the purpose of transmitting full-color RGB raster data. The control circuit identifies the types of control circuit command received. If the control circuit command is a backend parameter setting command, the backend parameter is stored in the command buffer within a memory device. If the control circuit command is an RGB data transmission command, full-color RGB raster data of the control circuit command are converted to binary CMYK raster data, and this binary CMYK raster data are stored in data buffer within the memory device. Subsequently, the control circuit reads the backend parameter from the command buffer and prepares a printer initial setting command from the backend parameter. The thus-prepared printer initial setting command is sent to the printer. Further, the CMYK raster data are read from the data buffer, and a raster data transmission command for use with the printer is prepared from the CMYK raster data. The thus-prepared raster data transmission command is sent to the printer.

17 Claims, 6 Drawing Sheets

PRINTER CONTROL CIRCUIT, PRINTER AND PRINT SYSTEM

BACKGROUND OF THE INVENTION

1. Field of the Invention

The present invention relates to a printer control technique for performing high-speed printing.

The present application is based on Japanese Patent Applications No. Hei. 10-77882 and Hei. 11-25764, which are incorporated herein by reference.

2. Description of the Related Art

A printer used with a computer system usually forms a pseudo-continuous tone image-which-visually appears to be a continuous tone, through use of a limited number of coloring agents, such as cyan, magenta, and yellow (CMY), or cyan, magenta, yellow, and black (CMYK), by printing or not printing a small point (dot) of each coloring agent at each pixel position on a sheet (and, in some types of printers, by changing dots so as to assume a plurality of different sizes). Accordingly, image data finally required by the printer usually comprise CMYK raster image data which represent whether or not a dot of each color of CMYK coloring agents is printed or not printed at each pixel position (in some types of printers, the CMYK raster image data further represent which of a plurality of dot sizes is designated). Such CMYK raster image data require a color component resolution of only two or so (but not too many) levels. Throughout the specification, such CMYK raster image data will be referred to as CMYK raster image data having a "low-value resolution."

Original image data—which are prepared by means of an application in a host computer which issues a print instruction to the printer or are input from the outside—are usually represented by a host color system differing from a printer color system; typically an RGB color system. Further, the original image data are RGB data having a "high-value resolution"; for example, a color component of 256-level gray scale. The original image data may be low-level data (raster image data) represented by a set of pixel values in one case and may be high-value data represented by a graphic function or character codes in another case.

In a conventional print system, the processing for converting high-value resolution RGB data of the original image into final CMYK data of low-value resolution is performed by means of a printer driver which is made up of software installed in a host computer, or by means of imaging software installed in the printer. The processing comprises a "rasterization" step of converting high-level original image data into raster image data; a "color conversion" step of converting RGB-based pixel values into CMY-based or CMYK-based pixel values through use of a look-up table; and a "halftoning" step of converting pixel values of high-value resolution into pixel values of low-value resolution through use of error variance or dithering. Further, in order to improve picture quality, an ink-jet printer employs a so-called "interlace" printing technique or an "overlap" printing technique, according to which dots are printed in a sequence differing from that in which the pixels are arranged. Interleaving of pixel values in a rearranged sequence for the purpose of effecting interlace printing or overlap printing is also carried out through the conversion process set forth.

If a printer driver carries out the foregoing conversion operations, the operations will impose a burden on the central processing unit (CPU) of a host computer. Similarly, if a printer carries out the foregoing conversion operations, the operations will impose a burden on the CPU of the printer. These processing operations are time consuming and account for a large portion of print time. A laser printer aimed at high-speed operations has a high-performance CPU and performs the foregoing conversion operations at high speed. Such a high-performance CPU is a primary factor for driving the cost of a laser printer considerably high. In contrast, in an ink-jet printer aimed at attaining a low price, a host computer processes all these operations. Consequently, the ink-jet printer is considerably slower in print speed, and the host computer is occupied for a long period of time, which in turn causes a delay in other tasks to be processed by the host computer.

SUMMARY OF THE INVENTION

Accordingly, the object of the present invention is to realize high-speed printing through use of inexpensive equipment.

Another object of the present invention is to realize high-speed printing without imposing a heavy burden on a CPU of a host computer in an environment where a low-speed printer, such as a conventional ink-jet printer, is used.

Still another object of the present invention is to provide an inexpensive printer capable of performing printing operations at high speed.

According to the present invention, a hardware circuit specifically designed for controlling a printer is interposed between a host machine, such as a host computer, and a printer. The printer-control-only hardware circuit may be incorporated into the host machine, incorporated into the printer, or embodied in the form of external device connected between the host machine and the printer.

The printer-control-only hardware circuit comprises a command analysis circuit, an image data processing circuit, a memory control circuit, command buffer memory, data buffer memory, and a command generation circuit.

The command analysis circuit receives a control circuit command from the host machine, determines whether the thus-received control circuit command is a backend parameter setting command used for transmitting a backend parameter which is required for resetting the printer or a high-order raster image transmission command for transmitting high-order raster image data (e.g., RGB raster data having high-value resolution), and transmits the backend parameter to the memory control circuit or the high-order raster image to the image data processing circuit.

The image data processing circuit converts the high-order raster image data received from the command analysis circuit into low-order image data (e.g., CMYK raster data having low-value resolution) required by a printing mechanism of the printer and transmits the low-order image data to the memory control circuit. For example, in a preferred mode, the image data processing circuit has a halftoning circuit which converts full-color RGB raster image data into binary CMYK raster image data.

The memory control circuit temporarily stores into the command buffer memory the backend parameter received from the command analysis circuit and temporarily stores into the data buffer memory the low-order raster image data received from the image data processing circuit. Further, the memory control circuit reads the backend parameter from the command buffer memory, transmits the thus-read backend parameter to the command generation circuit, reads the low-order raster image data from the data buffer memory, and transmits the thus-read low-order raster image data to the command generation circuit.

The command generation circuit generates, from the backend parameter received from the memory control circuit, a printer command for use in resetting the printer, transmits the thus-generated printer command to the printer, generates, from the low-order raster image received from the memory control circuit, a printer command for use in transmitting the low-order raster image to the printer, and transmits the thus-generated printer command to the printer.

By use of the above-described printer-control-only hardware circuit, at least a portion of data processing, which is performed by the CPU of a conventional host machine or the CPU of the printer, is offloaded from the CPU and placed on the printer-control-only hardware circuit, thereby lessening the burden imposed on the CPU. Particularly, an inexpensive, low-performance CPU may be used as the CPU of the printer. In a preferred mode, processing involving a heavy load, such a color conversion operation or a halftoning operation, is offloaded from the CPU and placed on the printer-control-only hardware circuit, thereby significantly lessening the burden imposed on the hostmachine or the printer. Further, as a matter of course, the printer-control-only hardware circuit is faster in processing speed than the CPU which processes a print job by use of software. Thus, high-speed printing can be effected. In addition, the printer-control-only hardware circuit is formed from an application-specified IC (ASIC), and hence a print system including the printer-control-only hardware circuit is less expensive than the conventional high-speed print system.

The printer-control-only hardware circuit determines whether the control circuit command received from the host machine is a backend parameter setting command used for transmitting a backend parameter required for resetting the printer or the raster image transfer command used for transmitting raster image data. The backend parameter is stored in a different buffer memory device than are the raster image data. The backend parameter is read from the buffer memory and is sent to the printer in the form of an initial setting command for the printer. Next, the raster image data are read from the buffer memory and are sent to the printer in the form of a raster image transfer command for the printer. As a result, in a case where the backend parameter setting command is sent first from the host machine and is followed by the raster image transfer command, the backend parameter is reliably processed earlier than are the raster image data without being affected by processing of the raster image data, thus enabling the printer setting command to be transmitted to the printer before the raster image data. In other words, the control circuit commands received from the host machine can be transmitted to the printer after having been converted into printer commands and while being maintained in the same sequence as that in which the control circuit commands are received from the host machine. As mentioned above, the sequence of control circuit commands is maintained even after the control circuit commands have been converted into the printer commands. Accordingly, at the time of newly designing a control circuit command system, existing printer command system resources can be utilized extensively, thus resulting in a reduction in labor for designing. Further, the foregoing method under which the sequence of command is maintained can be realized by use of a comparatively simple circuit configuration, thereby cutting the cost of the printer.

In a preferred mode, the printer-control-only hardware circuit further comprises a position control circuit connected to both the memory control circuit and the command generation circuit. The command generation circuit supplies, to the position control circuit the backend parameter received from the memory control circuit. On the basis of the backend parameter, the position control circuit determines specifications for interlace or overlap printing to be performed by the printer. According to the thus-determined specifications, the position control circuit selects pixels to be printed by a print head of the printer in each path. The position control circuit makes a request to the memory control circuit for the low-order raster data relating to the thus-selected pixels. In response to the request, the memory control circuit reads, from the data buffer memory, the low-order raster data that relate to the selected pixels and the area requested by the position control circuit and transmits the thus-read low-order raster data to the position control circuit. The position control circuit transmits to the command generation circuit the low-order raster data that relate to the selected pixels and are received from the memory control circuit. The command generation circuit generates, from the low-order raster data, a raster image transfer command for the printer and transmits the thus-generated raster image transfer command to the printer. As mentioned above, the printer-control-only hardware circuit determines specifications for interlace and overlap printing to thereby prepare raster data to be imparted to the print head in each path. Consequently, the CPU of the printer is freed from the burden of laborious printing associated with interlace and overlap printing. Alternatively, determining specifications for interlace and overlap printing may be performed by use of another very inexpensive CPU in lieu of the printer-control-only hardware circuit.

In another preferred mode, in a case where an image to be printed includes a natural image, characters, and graphics, an image relating to a natural image is sent to the printer-control-only hardware circuit in the form of high-order raster image data. Characters and graphics are sent to the printer-control-only hardware circuit in the form of a low-order raster image. In the printer-control-only hardware circuit, high-order raster image data regarding a natural image are converted to a low-order raster image. A low-order raster image corresponding to a complete print image is prepared by overlaying the low-order raster image relating to the natural image on the low-order raster image relating to characters and graphics.

In general, color conversion and halftoning of characters and graphics imposes a slight burden on the CPU, whereas color conversion and halftoning of a natural image imposes a heavy burden on the CPU. Since the processing involving a heavy burden is performed by the printer-control-only hardware circuit, the CPUs of the host machine and the printer can be freed from the heavy burden, thereby effectively increasing the processing speed. The profile of each of the characters and graphics must be clearly printed, and hence the characters and graphics require a high resolution. However, high-order raster data having a high resolution (e.g., full-color raster data) are enormous in volume. In contrast, low-order raster data (e.g., binary raster data) have a high resolution but are small in volume. For these reasons, so long as the high-resolution character/graphics image is transferred to the printer-control-only hardware circuit from the host machine in the form of low-order raster data, data transmission time is shortened.

Although a typical host machine corresponds to a host computer, the host machine is not limited to the host computer. In a preferred mode, the host machine may be a device—which outputs only high-order raster data, such as an image scanner or a digital camera, and which does not have the function of generating a control circuit command. The data flow controller is provided upstream of the printer-control-only hardware circuit. The data flow controller is connected to the host computer, the image scanner, and the digital camera at all times or whenever necessary. The data flow controller is equipped with a control panel (or is connected to a control panel of the printer in a case where the data flow controller is incorporated into the printer). Upon receipt of a control circuit command from the printer driver of the host computer, the data flow controller transfers the control circuit command in its present form to the printer-control-only hardware circuit. Upon receipt, from the control panel, of the designation relating to a mode for printing the image captured by the image scanner or the digital camera, the data flow controller reads raster image data (e.g., full-color RGB raster image data) from the image scanner or the digital camera. Further, the data flow controller generates a series of control circuit commands for the purpose of printing the raster image under the print conditions specified by the user by way of the control panel. The thus-generated control circuit commands are transmitted to the printer-control-only hardware circuit.

Features and advantages of the invention will be evident from the following detailed description of the preferred embodiments described in conjunction with the attached drawings.

DETAILED DESCRIPTION OF THE PREFERRED EMBODIMENTS

Figure 1:
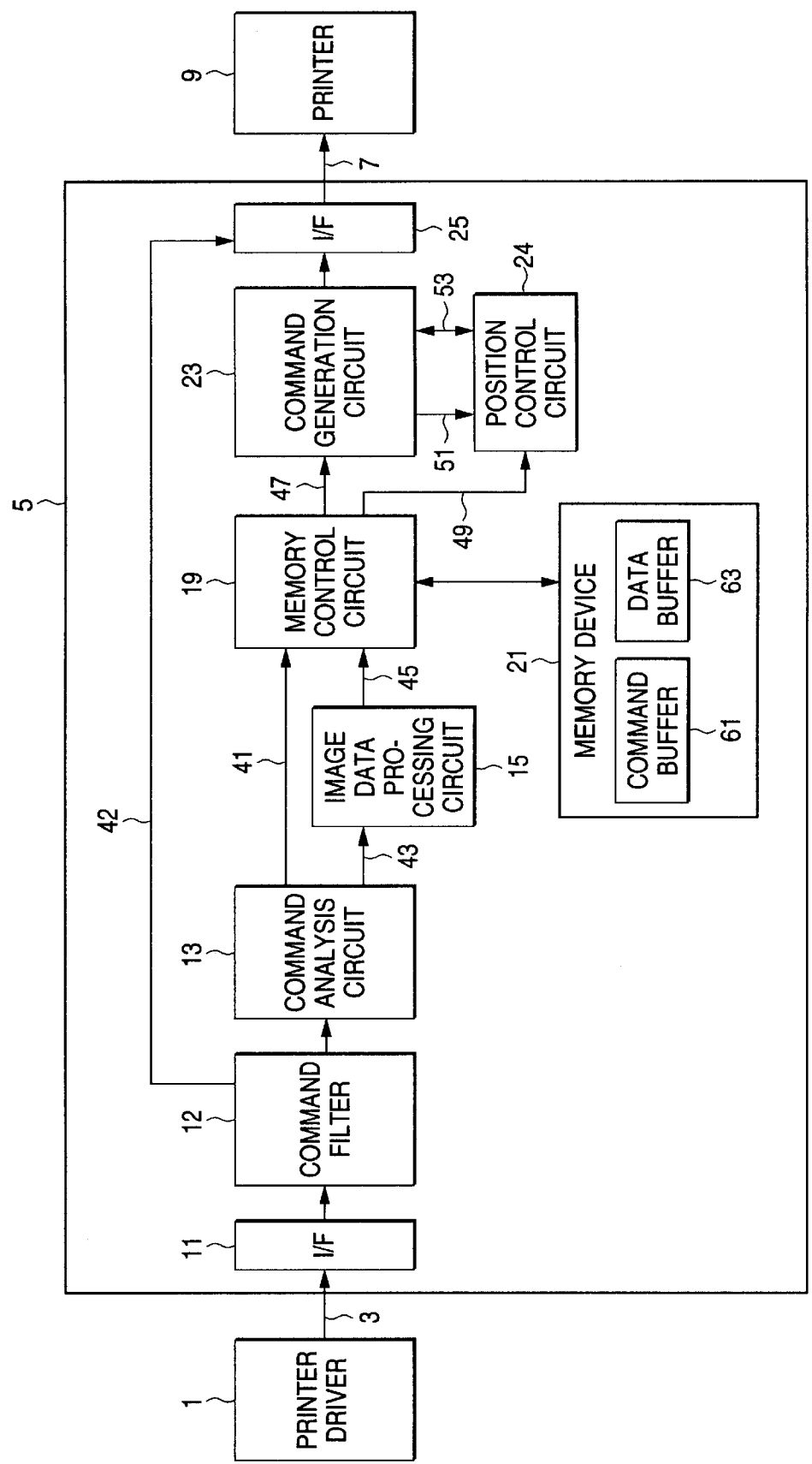
FIG. 1 is a block diagram showing the entire configuration of a print system according to one embodiment of the present a invention.

FIG. 1 shows the overall configuration of a print system according to one embodiment of the present invention.

A circuit 5 specifically designed to control a printer (hereinafter referred to simply as a "control circuit") is provided between a printer 9 and a printer driver 1 serving as software provided in a host computer. The control circuit 5 is a hardware logic circuit such as a combination of, e.g., an application-specified IC (ASIC) and a semiconductor memory chip, and is not a computer which executes software by means of a central processing unit. The control circuit 5 has the function of preparing a printer command 7 for use with the printer 9 and sends the thus-generated printer command 7 to the printer 9, upon receipt of a control circuit command 3 for use with the control circuit 5 from the printer driver 1.

Figure 2:
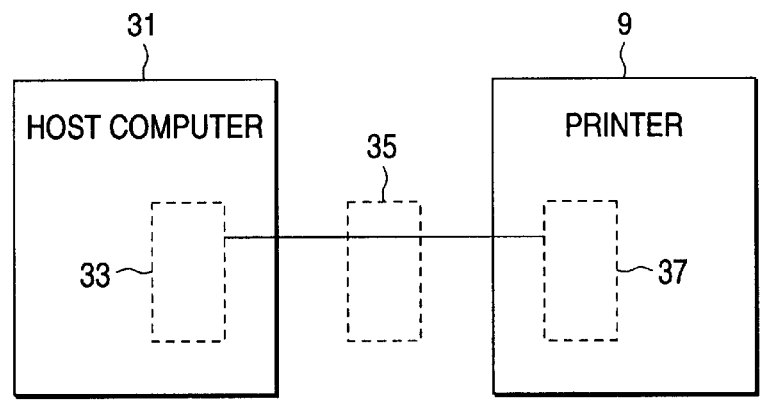
FIG. 2 shows variations in layout of a printer-control-only circuit (control circuit) 5.

The control circuit 5 has three main variations of layout, such as those shown in FIG. 2. Specifically, according to one variation of layout, the control circuit 5 is incorporated into a host computer 31, as represented by a block 33 shown in FIG. 2. According to another variation of layout, the control circuit 5 is incorporated into the printer 9, as represented by a block 37 shown in FIG. 2. Further, according to still another variation of layout, the control circuit 5 is embodied as an external device connected between the host computer 31 and the printer 9, as represented by a block 35 shown in FIG. 2. In the case where the control circuit 5 is incorporated into the host computer 31, the control circuit 5 is provided in the form of an optional board for use with the host computer and is directly connected to a CPU bus of the host computer 31 and is connected to the printer 9 by way of, e.g., a parallel interface cable (or a communications network). In the case where the control circuit 5 is incorporated in the printer 9, the control circuit 5 is provided in the form of an optional board for use with a printer and is directly connected to a CPU bus of the printer 9 and is connected to the host computer 31 by way of, e.g., a parallel interface cable (or a communications network). These two variations of layouts have the advantage of the ability to cope with a plurality of hosts. In the case where the control circuit 5 is embodied in the form of an external device, the control circuit 5 is connected to both the host computer 31 and the printer 9 by way of, e.g., a parallel interface cable (or a communications network).

As shown in FIG. 1, the control circuit 5 is equipped with an image data processing circuit 15. This image data processing circuit 15 has the function of receiving high-value resolution raster data of the host color system (i.e., "full-color RGB raster data" formed from an 8-bit word which permits a color component of each pixel to be expressed with a 256-step gradation in the present embodiment) and converting the full-color RGB raster data into low-value resolution raster data of the printer color system (i.e., "binary CMYK raster data" representing whether or not a CMYK dot is produced at the position of each pixel, in the present embodiment), through "color conversion" and "halftoning." In principle, the printer driver 1 is freed from a requirement to process original image data received from the operating system of the host computer through "color conversion" or "halftoning." As a result, the burden imposed on the CPU of the host computer is greatly lessened. Similarly, even the printer 9 is freed from the requirement to perform "color conversion" and "halftoning," thus lessening the burden imposed on the CPU of the printer 9. In contrast, the image data processing circuit 15 of the control circuit 5 is hardware specifically designed for performing "color conversion" and "halftoning," and hence the image data processing circuit 15 performs these processing operations at high speed. Therefore, the print speed of the print system is improved. Moreover, the control circuit 5 is formed from an ASIC and is considerably less expensive than a high-performance CPU. Therefore, the print system according to the present invention is less expensive than a print system using a conventional high-speed printer.

As mentioned previously, the printer driver 1 is in principle freed from the requirement to perform "color conversion" and "halftoning" operations. However, in the present embodiment, the printer driver 1 does not completely abandon these processing operations but performs selecting operations (provided below) according to the type of an image. More specifically, upon receipt of original image data from the operating system of the host computer, the printer driver 1 separatively extracts character/graphics data and natural image data other than the character/graphics data from the original image data. Of the character/graphics data, characters are originally expressed by character codes and character attribute (i.e., size and qualification) codes, and graphics are represented in function call or by vector data. The printer driver 1 converts the character/graphics data into binary CMYK raster data through "rasterization," "color conversion," and "halftoning." The thus-converted binary CMYK raster data are sent to the control circuit 5 while being compressed and incorporated into the control circuit command 3. Meanwhile, the natural image data are originally represented by typical full-color RGB raster data. The printer driver 1 sends the natural image data to the control circuit 5 while the natural image data are maintained in the full-color RGB raster data and being compressed and incorporated into the control circuit command 3, without involvement of "color conversion" or "halftoning." Accordingly, the image data processing circuit 15 of the control circuit 5 processes only the natural image RGB data through "color conversion" and "halftoning."

As mentioned above, the printer driver 1 processes characters and graphics through "color conversion" and "halftoning," and the control circuit 5 processes the natural image through "color conversion" and "halftoning." There are two primary reasons for employing such processing as follows; i.e., first, the processing of characters and graphics imposes a light burden on the CPU but the processing of a natural image imposes a heavy burden on the CPU. For this reason, the control circuit 5, which is hardware specifically designed for performing such heavy-burden processing, performs the processing to thereby free the CPU from the processing and is most effective in increasing the processing speed of the print system. Second, the profile of each of the characters and graphics must be clearly printed, and hence the characters and graphics require a high resolution. However, full-color high resolution RGB raster data are enormous in volume. In contrast, binary CMYK raster data have a high resolution but are small in volume. For these reasons, so long as the high-resolution character/graphics image transmitted to the control circuit 5 from the printer driver 1 is in the form of binary CMYK raster data, a data transmission time is shortened.

The configuration and operation of the control circuit 5 will now be described in detail.

As shown in FIG. 1, the control circuit 5 comprises a host interface circuit 11, a command filter 12, a command analysis circuit 13, the image data processing circuit 15, a memory control circuit 19, a memory device 21, a command generation circuit 23, a position control circuit 24, and a printer interface circuit 25.

The host interface circuit 11 receives a control circuit command to be described later from the printer driver 1 of the host machine (not shown). Among the commands received by the command filter 12, the command filter 12 sends to the command analysis circuit 13 only those commands that the command analysis circuit 13 can understand. The command analysis circuit 13 analyzes each received control circuit command so as to identify the type of command, and transfers the data included in the command to the appropriate address (i.e., the memory control circuit 19 or the image data processing circuit 13). The image data processing circuit 15 receives full-color RGB raster data for a natural image from the command analysis circuit 13 and processes the full-color RGB raster data through color conversion and halftoning, thereby preparing binary CMYK raster data.

The memory control circuit 19 receives a backend parameter (a parameter required for performing a printing operation on the basis of the binary CMYK raster data) to be described later from the command analysis circuit 13 and stores the thus-received backend parameter into a command buffer 61 of the memory device 21. The memory control circuit 19 receives the binary CMYK raster data for characters and graphics from the command analysis circuit 13. Further, the memory control circuit 19 receives the binary CMYK raster data for a natural image from the image data processing circuit 15 and stores the thus-received binary CMYK raster data into a data buffer 63 of the memory 21. The image data processing circuit 15 reads the backend parameter from the command buffer 61 and sends the thus-read backend parameter to the command generation circuit 23. Subsequently, the binary CMYK raster data are read from the data buffer 63 and are sent to the position control circuit 24.

The position control circuit 24 converts the binary CMYK raster data received from the memory control circuit 19 into data suitable for the specifications for interlace and overlap printing (hereinafter referred to as "interlace CMYK raster data"). The thus-converted data are then transferred to the command generation circuit 23. The command generation circuit 23 generates, based on the backend parameter received from the memory control circuit 19, a printer command used for resetting the printer 9. On the basis of the interlace CMYK raster data received from the position control circuit 24, the command generation circuit 23 prepares a printer command used for transferring the interlace CMYK raster data to the printer. The printer interface circuit 25 transfers to the printer 9 the printer command prepared by the command generation circuit 23.

The respective capability of individual sections of the control circuit 5 will be described in detail hereinbelow.

The host interface circuit 11 receives a series of control circuit commands 3 from the printer driver 1 of the host machine and sends the thus-received commands to the command analysis circuit 13.

The control circuit commands have, e.g., a format such as that provided below.
[command code] [parameter] [data]
The command codes are as follows:
(1) ESC(G
This command code represents an RGB raster graphic mode start command to be described later.
(2) <xferj>
This command code represents a data transmission command. The data transmission command comprises three types of commands; namely, an image conversion parameter setting command, a backend parameter setting command, and an RGB data transmission command, all of which will be described later.
(3) <xferC>
This command code also represents a data transmission command; particularly, a CMYK data transmission command to be described later.
(4) <eor>
This command code represents a raster end command to be described later.
(5) <FF>
This command code represents a page end command to be described later.
(6) <exit>
This command code represents an RGB raster graphic mode end command to be described later.

Of the foregoing command codes, the codes <eor>, <FF>, and <exit> are accompanied by neither parameters nor data.

The data transmission command including command code <xferJ> comprises three types of commands; i.e., an image conversion parameter setting-command, a backend parameter setting command, and an RGB data transmission command. Each of these data transmission commands is accompanied by a parameter and data. The parameter of each data transmission command includes the effective bit width of the data, the data compression method, device selection representing the address to which the data are to be transferred, the register address where the data stored in the device are to be stored, and a designation relating to the number of data sets. Through device selection, there can be determined the type of command (of the three types of commands) to which the current data transmission command pertains. The image conversion parameter setting command comprises an image conversion parameter to be described later; the backend parameter setting command comprises a backend parameter; and the RGB data transmission command comprises full-color RGB raster data regarding a natural image.

The CMYK data transmission command having the <xferC>command code also has a parameter and data. This command comprises binary CMYK raster data regarding the characters and graphics generated by the printer driver 1.

As mentioned, there are four types of data transmission commands. Of these data transmission commands, the image conversion parameter setting command and the backend parameter setting command are generically called "parameter setting commands," and the RGB data transmission command and the CMYK data transmission command are generically called "raster image transfer commands."

The command analysis circuit 13 stores into FIFO memory (not shown) provided therein the control circuit commands received from the printer driver 1 of the host machine and reads and analyzes the commands in the sequence of receipt, thereby identifying the type of each command. The types of control circuit commands are described as follows, in the sequence in which they are transmitted from the printer driver 1.

(1) RGB Raster Graphic Mode Start Command

This command has a format of "ESC (G" and gives the control circuit 5 an instruction for entering an RGB raster graphic mode. The expression "RGB raster graphic mode" corresponds to a mode in which full-color RGB raster data received from the host computer are converted into binary CMYK raster data, and the thus-converted binary CMYK raster data are output to the printer. Only when the control circuit 5 is in the RGB raster graphic mode, the command analysis circuit 13 receives the following commands.

(2) Image Conversion Parameter Setting Command

This command has a format of "<xferJ> parameter data" and gives the control circuit 5 an instruction for setting in the image data processing circuit 15 a parameter (hereinafter referred to as an "image conversion parameter") required for color conversion and halftoning. The device selection included in the parameter of the command designates the image data processing circuit 15, and the data of the command correspond to the image conversion parameter. For example, a typical image conversion parameter comprises various types of look-up tables, such as an RGB/CMYK conversion table for color conversion, a dither threshold matrix used for dithering, and a γ correction table for γ correction.

(3) Backend Parameter Setting Command

The command has a format of "<xferJ> parameter data" and gives the control circuit 5 an instruction for setting, in a related section of the control circuit 5 (typically the position control circuit 24 to be described later) or in the printer, various parameters required for correctly controlling a printing mechanism of the printer (e.g., a print head, a carriage, or a sheet feeder of an ink-jet printer) such that dots are printed on a sheet. The parameter is required by a processing module disposed downstream of the image data processing circuit 15 and by the printer 9 (i.e., a backend program). In this sense, the parameter is called a "backend parameter." The device selection in the parameter of the command designates a backend, and the data of the command correspond to the backend parameter. For example, the backend parameter includes the horizontal and vertical resolution of a CMYK raster image, the number of dots in one raster (one horizontal line), the number of vertical dots per page, page length, top/bottom/left margins, the nominal amount of paper feed, designation of dot size, designation of either uni-directional printing or bi-directional printing, the number of paths (or nozzle pitch) to be used when interlace printing is carried out, the number of nozzles to be used, and a modified amount of paper feed.

(4) RGB Data Transmission Command

This command has a format of "<xferJ> parameter data" and gives an instruction for supplying to the control circuit 5 full-color RGB raster data regarding a natural image for every raster (every horizontal line) on a page and subjecting the raster data to color conversion and halftoning. The device selection in the parameter of the command designates the image data processing circuit 15, and the data of the command correspond to the full-color RGB raster data for one raster (or for each of the segments formed through separation of a single raster).

(5) CMYK Data Transmission Command

This command has a format of "xferC" parameter data" and supplies to the control circuit 5 binary CMYK raster data regarding characters and graphics for every raster (i.e., every horizontal line) on a page. The data of the command correspond to binary CMYK raster data for one raster (or for each of the segments formed through separation of a single raster).

With regard to the raster including a natural image, characters, and graphics, there are transmitted an RGB data transmission command and a CMYK data transmission command. With regard to the raster including only a natural image, there is transmitted an RGB data transmission command. With regard to the raster including only characters and graphics, there is transferred a CMYK data transmission command.

(6) Raster End Command

This command has a format of "<eor>" and reports the end of a single raster.

(7) Repetition of the operations described in paragraphs (4) and (6)

The RGB data transmission command and the raster end command are repeatedly transmitted until the final raster within the page is reached.

(8) Page End Command

This command has a format of "<FF>" and reports a form feed.

(9) Repetition of the operations described in paragraphs (2) through (8)

The operations described in paragraphs (2) through (8) are repeated until the final page of the print job is reached. The commands referred to in paragraphs (2) and (3) may be arranged so as to be sent only once at the beginning of the print job.

(10) RGB Raster Graphic Mode End Command

This command has a format of "<exit>" and reports the end of the RGB raster graphic mode. After completion of the RGB raster graphic mode, the command analysis circuit 13 receives no other commands until it receives the next RGB raster graphic mode start command.

The command analysis circuit 13 identifies the type of command from the command code of the received control circuit command or the command code and the parameter of the same. More specifically, from the command code, the command analysis circuit 13 determines whether the received control circuit command is the RGB raster graphic mode start command, the "<xferJ>" command, the CMYK data transmission command, the raster end command, the form feed command, or the RGB raster graphic mode end command. In the case of the "<xferJ>" command, the command analysis circuit 13 determines, from the device selection included in the parameter, whether the data transmission command is a backend parameter setting command or another command (e.g., an image conversion parameter setting command or an RGB data transmission command).

The operations performed by the command analysis circuit 13 vary according to the result of identification of the command. The operations will now be described in the sequence in which the commands are received.

(1) First, the command analysis circuit 13 receives a command code "ESC(G"; i.e., the RGB raster graphic mode start command. Upon receipt of the command code, the command analysis circuit 13 enters the RGB raster graphic mode and becomes ready to receive subsequent commands.

(2) Next, the command analysis circuit 13 receives a command code "<xferJ>"; i.e., a data transmission command. Upon receipt of this command, the command analysis circuit 13 analyzes the parameter of the command code. From the device selection included in the parameter, the command analysis circuit 13 identifies the device to which the data are to be sent. Of the three types of data transmission commands set forth, the image conversion parameter setting command is received first, and the device selection included in this command designates the image data processing circuit 15. Upon receipt of this command, the command analysis circuit 13 sends to the image processing circuit 15 a register address included in the parameter of the command and the data of the command (i.e., the image conversion parameter), as designated by arrow 43. At this time, if the image conversion parameter is in a compressed state, the command analysis circuit 13 transmits the image conversion parameter to the image data processing circuit 15 after having expanded the image conversion parameter. The image data processing circuit 15 sets the image conversion parameter in the specified register address. As a result, the configuration of the image data processing circuit 15 is set so that full-color RGB raster data, which will be received later, can be correctly subjected to color conversion and halftoning.

(3) After completion of receipt of all the image conversion parameter setting commands, the command analysis circuit 13 receives the backend parameter setting command assigned the command code "<xferJ>." The device selection included in the command designates a backend. Upon receipt of this command, the command analysis circuit 13 sends to the memory control circuit 19 the register address included in the parameter of the command and data of the command (i.e., a backend parameter), as designated by arrow 41.

(4) After completion of receipt of all the image conversion parameter setting commands, the command analysis circuit 13 receives a raster image transfer command relating to each raster. With regard to the raster including a natural image, characters, and graphics, the RGB data transmission command relating to the natural image is received first, followed by the CMYK data transmission command relating to characters and graphics. With regard to the raster including only a natural image, only the RGB data transmission command is received. With regard to the raster including only characters and graphics, only the CMYK data transmission command is received. The RGB data transmission command has the <xferJ> command code, and the device selection included in the command code designates the image processing circuit 15. The command analysis circuit 13 sends to the image data processing circuit 15 the register address included in the parameters of the RGB data transmission command and the data of the command (i.e., full-color RGB raster data regarding a natural image), as designated by arrow 43. At this time, if the full-color RGB raster data included in the command are in a compressed state, the command analysis circuit 13 sends the data to the image data processing circuit 15 after having expanded the data. Further, the command analysis circuit 13 sends the data regarding the CMYK data transmission command (i.e., binary CMYK raster data regarding characters and graphics) to the memory control circuit 19, as designated by arrow 41.

(5) Subsequent to the raster image transfer command for a single raster, the command analysis circuit 13 receives a command code of "<eor>"; i.e., a raster end command. The command analysis circuit 13 sends the raster end command to the memory control circuit 19, as designated by arrow 41. Since the raster image transfer command and the raster end command repeatedly enter the command analysis circuit 13; i.e., once for every raster included on a single page, the command analysis circuit 13 repeatedly performs the operations described in paragraphs (4) and (5).

(6) Receipt of the next command data of "<FF>"; i.e., a page end command, follows the receipt of the raster end command regarding the final raster for a single page. Upon receipt of the page end command, the command analysis circuit 13 refrains from receiving a new command from the host until it receives from the command generation circuit 23 a report stating that transfer of all the data sets for the previous page to the printer has finished. Upon receipt of the report, the command analysis circuit 13 commences receipt of commands for the next page.

(7) Receipt of a command code of "<exit>"; i.e., an RGB raster graphic mode end command, follows the receipt of the page end command regarding the final page of the print job. Upon receipt of the RGB raster graphic mode end command, the command analysis circuit 13 completes the RGB raster graphic mode and, from then on, does not receive any command at all other than the command "ESC(G"; i.e., the RGB raster graphic mode start command. Received commands other than the RGB raster graphic mode start command are directly transmitted to the printer, as designated by arrow 42.

As is obvious from the foregoing description, the image processing circuit 15 receives various types of image conversion parameters and their register addresses from the command analysis circuit 13. The image processing circuit 15 stores each of the thus-received image conversion parameters into the specified register address, so that the image processing circuit 15 is configured so as to be able to correctly carry out color conversion and halftoning. Subsequently, the image processing circuit 15 receives from the command analysis circuit 13 full-color RGB data regarding a natural image for each raster and a register address of the data. The image data processing circuit 15 converts the received full-color RGB raster data for each raster into binary CMYK raster data through color conversion and halftoning and sends the thus-converted binary CMYK raster data to the memory control circuit 19, as designated by arrow 45.

As is evident from the previous description, the memory control circuit 19 receives a backend parameter and its register address from the command analysis circuit 13. The memory control circuit 19 stores into the command buffer 61 within the memory 21 the thus-received backend parameter and the register address. Subsequently, the memory control circuit 19 receives from the image data processing circuit 15 the binary CMYK raster data for each raster in a natural image. Further, the memory control circuit 19 receives the binary CMYK raster data regarding characters and graphics from the command analysis circuit 13 and stores the thus-received binary CMYK raster data into the data buffer 63 within the memory device 21. At this time, if the memory control circuit 19 receives both the CMYK raster data regarding a natural image and the CMYK raster data regarding characters and graphics, with regard to the same raster, the CMYK natural image raster data and the character/graphics CMYK raster data are written into the data buffer 63 while they are superimposed one over another (i.e., exclusive OR). Every time the binary CMYK raster data of each raster are completed, the memory control circuit 19 receives the raster end command from the command analysis circuit 13, thereby acknowledging the end of each raster.

Immediately after entering the RGB raster graphic mode, the memory control circuit 19 receives from the command generation circuit 23 to be described later a command request for "transmitting a command." After having written the backend parameter and its register address into the command buffer 61, the memory control circuit 19 reads the backend parameters and their register addresses from the command buffer 61 in the sequence in which they are written, in response to the command request. The thus-read backend parameter and its register address are transmitted to the command generation circuit 23, as designated by arrow 47. After having finished transferring all the backend parameters, the memory control circuit 19 receives from the position control circuit 24 a data request for "transmitting data regarding the designated raster." Upon receipt of this request, the memory control circuit 19 reads from the data buffer 63 the binary CMYK raster data regarding the raster designated by the data request and transmits the thus-read binary CMYK raster data to the position control circuit 24, as designated by arrow 49.

Immediately after having entered the RGB raster graphic mode, the command generation circuit 23 issues the command request to the memory control circuit 19, thereby receiving the backend parameter and its register address from the memory control circuit 19. The command generation circuit 23 stores the thus-received backend parameter in the register addresses specified therein. After having finished storing all the backend parameters into the appropriate registers, the command generation circuit 23 sends to the position control circuit 24 the parameters (in reality, substantially all the backend parameters) required by the position control circuit 24 to be described later, from among the backend parameter, as designated by arrow 51. As a result, the position control circuit 24 is configured; namely, specifications for interlace printing or overlap printing can be determined on the basis of the backend parameter, as will be described later.

The command generation circuit 23 commences a series of operations for generating printer commands and sequentially transmits the thus-generated printer commands to the printer 9 by way of the printer interface circuit 25. During the course of generation of the printer commands, the command generation section 23 prepares the first command, such as a job start declaration, and sends the thus-prepared command to the printer 9. Subsequently, through use of the parameters required by the printer from among the backend parameters, the command generation circuit 23 prepares the first command, such as a job start declaration, and sends the thus-prepared command to the printer 9. Subsequently, through use of the parameters required by the printer from among the backend parameters, the command generation circuit 23 prepares an initial setting command for use in resetting the printer and sends the thus-prepared initial setting command to the printer 9. The command generation circuit 23 makes a request to the position control circuit 24 for CMYK raster data and receives interlace CMYK raster data from the position control circuit 24. The thus-received interlace CMYK raster data are converted into a printer command used for transmitting the CMYK data and sends the printer command to the printer 9. As will be described later, the position control circuit 24 sends interlace CMYK raster data required by the print head for each path (horizontal scanning) of the print head of the printer 9. The command generation circuit 23 transmits the CMYK raster data for each path to the printer 9. Every time transmission of the CMYK data for a path is completed, a paper feed command for feeding the paper to the next path position is sent to the printer 9.

In response to the data request from the command generation circuit 23, the position control circuit 24 sends the data request to the memory control circuit 19 and receives binary CMYK raster data from the memory control circuit 19. The thus-received binary CMYK raster data are converted into interlace CMYK data, and the thus-converted interlace CMYK data are sent to the command generation circuit 23, as designated by arrow 53. During the foregoing operation, the position control circuit 24 sets, on the basis of the initially-set backend parameter, specifications for interlace printing and overlap printing optimum for an image to be printed; more specifically, the number of rasters whose dots (pixels) are generated by dot formation elements (e.g., ink-jet nozzles) of the print head of the printer 9 and the number of dot pitches between the dots, for each path (i.e., horizontal scanning) of the print head. The position control circuit 24 sends to the memory control circuit 19 a request for the thus-determined CMYK raster data regarding the dots (pixels) to be generated by the individual dot formation elements and receives the data. Null data regarding dots not to be generated are added to the thus-received CMYK data, thereby generating interlace CMYK data to be imparted to the individual dot formation elements for each path. The thus-generated CMYK data are sent to the command generation circuit 23. As mentioned above, the position control circuit 24 determines, on the basis of the backend parameter, specifications for optimum interlace and overlap printing. When printing operations are performed according to the specifications, interlace CMYK raster data required by the print head are prepared, and the thus-prepared interlace CMYK raster data are sent to the command generation circuit 23.

A printer interface circuit 25 sends the printer command received from the command generation circuit 23 to the printer 9.

Figure 3:
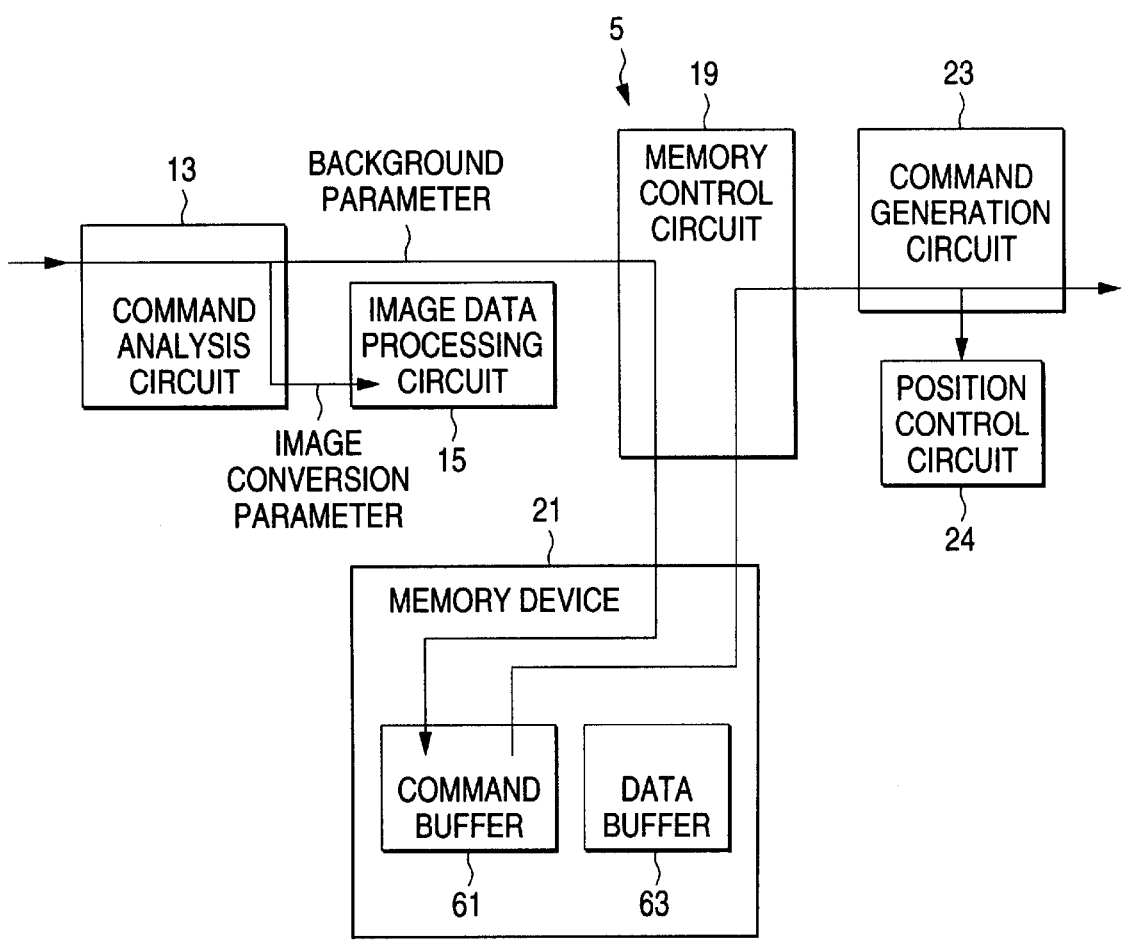
FIG. 3 is a block diagram showing a process of processing parameters within the control circuit 5.
Figure 4:
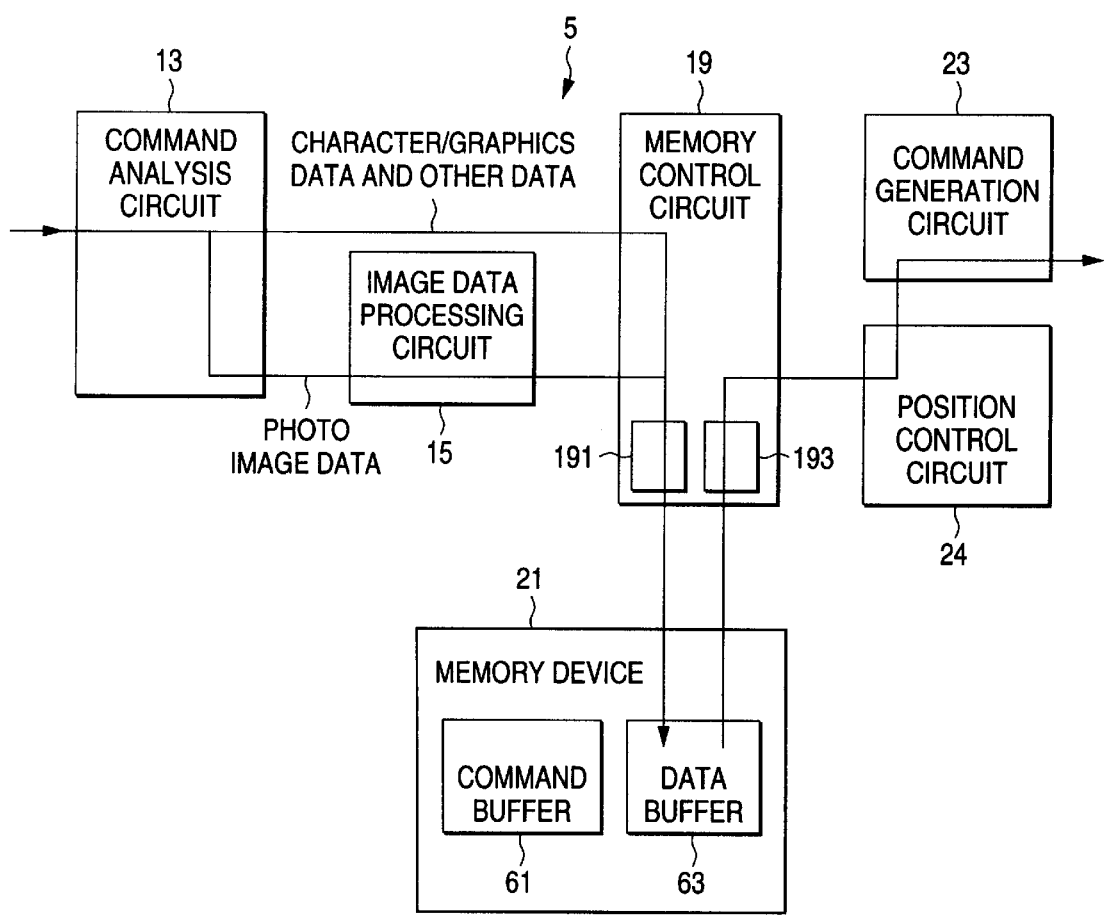
FIG. 4 is a block diagram showing a process of processing data within the control circuit 5.

FIGS. 3 and 4 show the processing the parameters and raster image sent from the host machine under the following configuration.

(1) Process of Generating a Parameter (see FIG. 3)

The backend parameter setting command transmitted from the printer driver 1 is analyzed by the command analysis circuit 13. The backend parameter, i.e., the data of the command, is sent directly to the memory control circuit 19 from the command analysis circuit 13. The memory control circuit 19 temporarily stores the thus-received backend parameter to the command buffer 61 within the memory device 21. In response to the command request from the command generation circuit 23, the backend parameter is read from the command buffer 61, and the thus-read parameter is sent to the command generation circuit 23. The command generation circuit 23 sets the thus-received backend parameter in the internal register. Further, the command generation circuit 23 sends to the position control circuit 24 the backend parameter—required for determining specifications for interlace and overlap printing. The backend parameter required for resetting the printer 9 is sent to the printer 9 in the form of the printer initial setting command. The initial setting command is transmitted only once per page (or only once per job).

The backend parameter setting command is followed by the image conversion parameter setting command from the printer driver 1. The image conversion parameter setting command is analyzed by the command analysis circuit 13, and the image conversion parameter that constitutes the data of the command is transmitted to the image data processing circuit 15 from the command analysis circuit 13. The image data processing circuit 15 sets the image conversion parameter in the internal register, whereby the image data processing circuit 15 is configured so as to be able to correctly perform conversion and halftoning operations.

(2) Process of Processing Raster Image (see FIG. 4)

Subsequent to the aforementioned parameter setting command, the raster image transfer commands are transmitted from the printer driver 1 on a per-raster basis. The raster image transfer commands comprise an RGB data transmission command and a CMYK data transmission command. The RGB data transmission command is analyzed by the command analysis circuit 13, and the data of the RGB data transmission command, i.e., the full-color RGB raster data regarding a natural image, are transferred to the image data processing circuit 15. The image data processing circuit 15 converts the thus-received full-color RGB raster data into the binary CMYK raster data and sends this binary CMYK raster data to the memory control circuit 19. The CMYK data transmission command is analyzed by the command analysis circuit 13, and the data of the CMYK data transmission command, i.e., binary CMYK raster data regarding characters and graphics, are directly transferred to the memory control circuit 19 from the command analysis circuit 13. The memory control circuit 19 compresses the thus-received binary CMYK raster data regarding a natural image, characters, and graphics through use of an encoder 191 and temporarily stores the thus-compressed binary CMYK raster data into the data buffer 63 within the memory device 21. The required capacity of data buffer 63 can be reduced by storing the binary CMYK raster data into the data buffer 63 while the binary CMYK raster data are in a compressed state. Further, in response to the data request from the position control circuit 24, the memory control circuit 19 selectively reads from the data buffer 63 the binary CMYK raster data regarding the dots (pixels) to be generated by means of the print head for each path, and sends the thus-read binary CMYK raster data to the position control circuit 24 after having reproduced the original data from the compressed binary CMYK raster data by use of a read decoder 193. The position control circuit 24 prepares, from the thus-received binary CMYK raster data, interlace binary CMYK raster data required by the print head for each path. The thus-prepared binary CMYK interlaced raster data are sent to the command generation circuit 23. The command generation circuit 23 converts the thus-received interlace binary CMYK raster data for each path into the CMYK raster data transmission command to be sent to the printer 9. The thus-converted CMYK raster data transmission command is then transmitted to the printer 9. Further, the command generation circuit 23 prepares a paper feed command after the CMYK raster data transmission command for each path and transmits the command to the printer 9.

In the previously-described control circuit 5, it is to be noted that initial setting of configuration of the control circuit 5 for the purpose of correctly generating the configuration of the control circuit 5 as well as generation of a printer command are carried out on the basis of the command from the host computer. More specifically, the image data processing circuit 15 is reset by means of the image conversion parameter setting command. Further, the position control circuit 24 is reset by means of the backend parameter setting command. Thus, the configuration of the control circuit 5 can be set by means of the parameter setting command from the host machine, and hence the printer driver 1 can control details of the color conversion and halftoning operations performed by the control circuit 5, as well as the specifications for interlace and overlap printing. For example, according to the type of printer or the type of an image to be printed, optimum configuration can be set for the control circuit 5 by means of a command from the printer driver. Accordingly, the control circuit 5 of identical hardware configuration can be applied to different types of printers and to printing of an image of different characteristics. In short, the control circuit 5 is general purpose.

The foregoing control circuit 5 is configured so as to be applied to a case where a conventional printer driver which produces only a printer command is used with a host computer. More specifically, after having exited from the RGB raster graphic mode, the command analysis circuit 13 of the control circuit 5 does not interpret any command unless it receives again the RGB raster graphic mode start command "ESC(G." In a preceding stage of the command analysis circuit 13, the command filter 12 catches a command other than the foregoing commands sent from the host computer during the RGB raster graphic mode and sends the thus-received command to the printer interface circuit 25 by way of the through path 42, without sending the command to the command analysis circuit 13. The printer interface circuit 25 sends the command in its present form to the printer 9. Accordingly, the printer command issued by the conventional printer is sent to the printer 9 by bypassing the control circuit 5, thereby enabling the printer 9 to be driven in the same manner as the conventional printer.

In the foregoing control circuit 5, the backend parameter received from the host machine is sent to the command generation circuit 23 by way of a route independent of the route of processing the RGB raster data. Accordingly, the initial setting of the control circuit 5 and the printer 9 on the basis of the backend parameter can have been completed prior to generation of CMYK raster data without fail, thereby rendering printing operations more efficient.

The aforementioned circuit configuration enables the control circuit 5 serving as printer control hardware to perform the color conversion and halftoning of image data regarding a natural image that causes the heaviest burdens among the print processing jobs, thereby realizing high-speed printing inexpensively.

Figure 5:
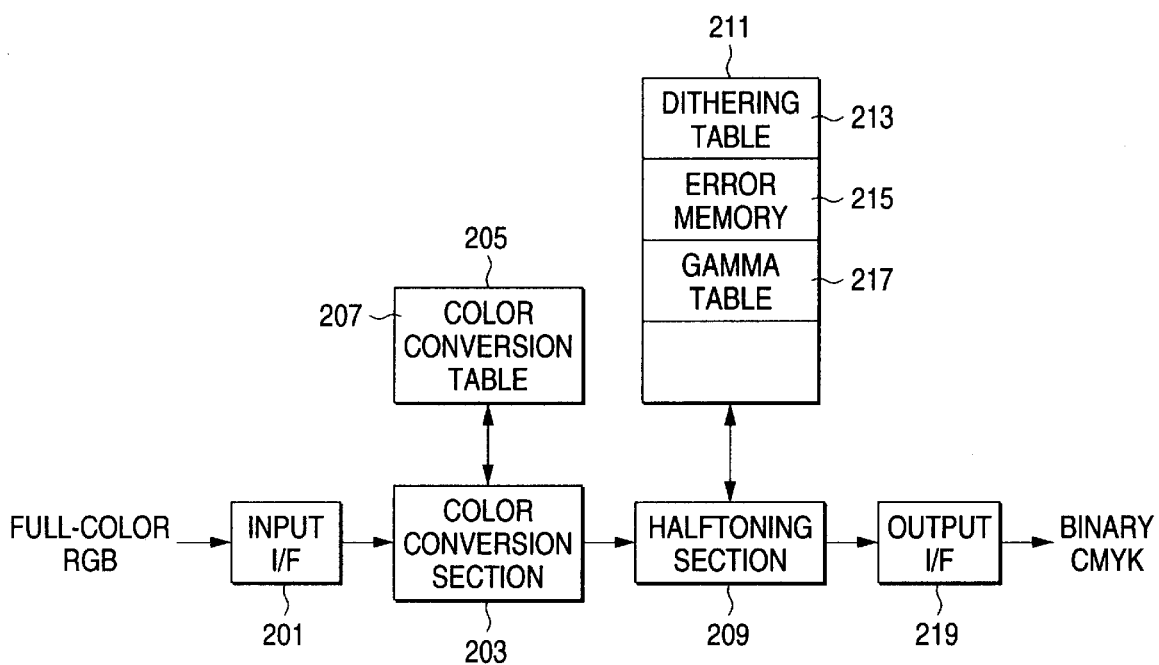
FIG. 5 is a block diagram showing the internal configuration of an image data processing circuit 15.

FIG. 5 shows the internal configuration of the image data processing circuit 15.

Full-color RGB raster data are first input to a color conversion section ] by way of an input interface 201. In an internal memory region 205 of the color conversion section 203, a color conversion table 207 which represents a relationship of conversion of values from the RGB color system to the CMYK color system is set beforehand by the previously-described image conversion parameter setting command. By reference to the color conversion table 207, the color conversion section 203 converts the input full-color RGB raster data into multi-valued CMYK raster data of full-color (or few number of colors). The multi-valued CMYK raster data are input to the halftoning section 209. A dithering table 213 to be used for dithering and a gamma table 217 to be used for γ correction are set in an internal memory region 211 of the halftoning section 209, by means of the previously-described image conversion parameter setting command. To carry out error variation, error memory 215 for storing varied errors is ensured. A halftoning section 209 subjects the multi-valued CMYK raster data to gamma correction, by reference to the gamma table 217. Further, the halftoning section 209 converts the gamma-corrected multi-valued CMYK raster data into binary CMYK raster data, by reference to the dithering table 213 or through use of the error memory 215. The binary CMYK raster data are output to an output interface section 219.

Figure 6:
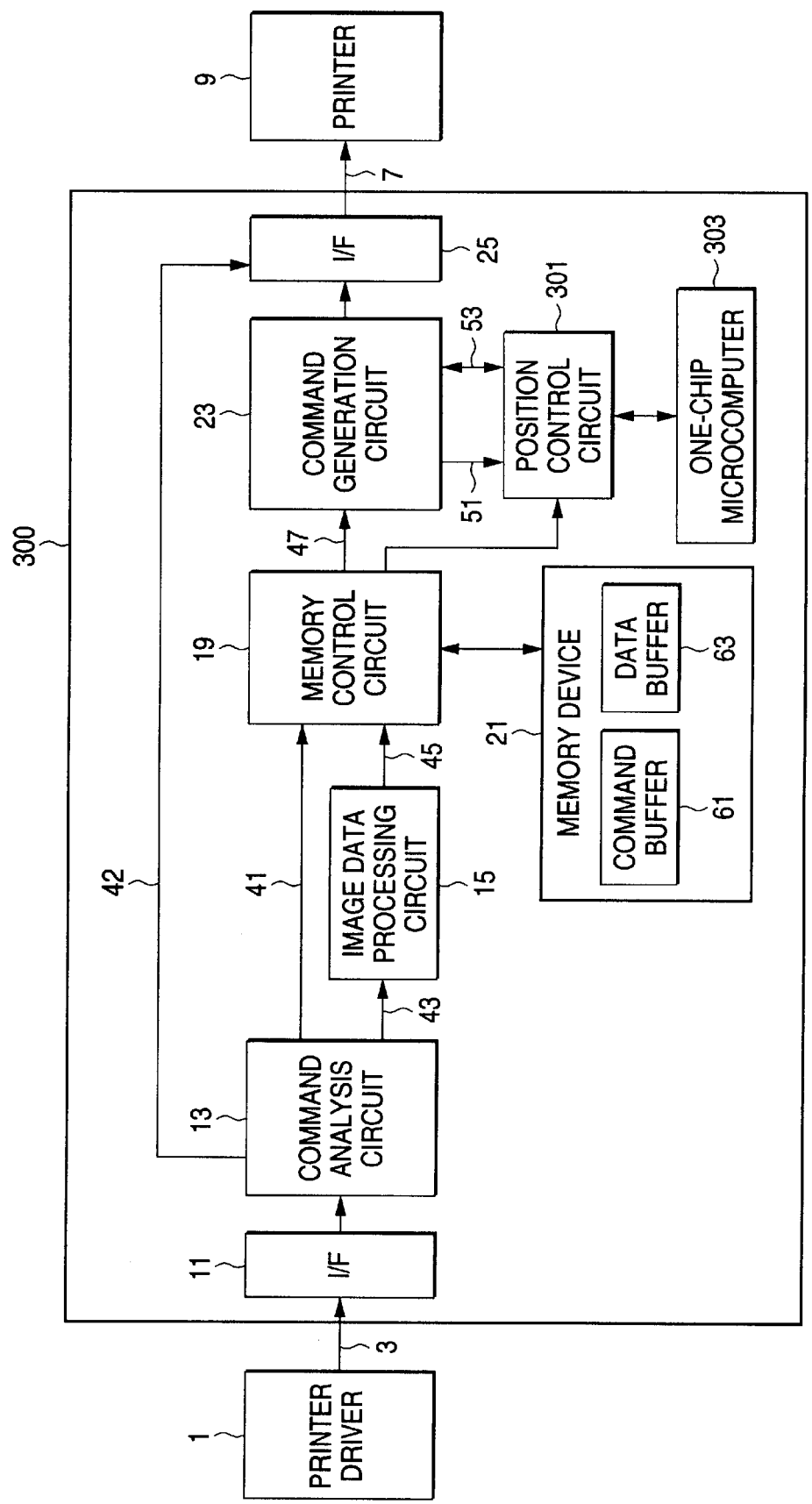
FIG. 6 is a block diagram showing the configuration of a print system according to another embodiment of the present invention.

FIG. 6 shows a block diagram showing a control circuit according to another embodiment of the present invention. The elements which are substantially identical in function to those shown in FIG. 1 are assigned the same reference numerals. Repetition of their explanations will be omitted here.

A control circuit 300 shown in FIG. 6 is not wholly formed from the printer-control-only hardware circuit but comprises a one-chip microcomputer 303. The primary role of the microcomputer 303 is to assist the position control circuit 301. More specifically, of the processing operations performed by the position control circuit 24 shown in FIG. 1, the microcomputer 303 undertakes an processing operation of determining, on the basis of the backend parameter, the dots (pixels) to be printed by the dot generation elements for each path (i.e., determination of specifications optimum for interlace printing and overlap printing). The position control circuit 301 undertakes the remaining processing operations. Since an algorithm for determining specifications for interlace printing and overlap printing is considerably complicated, it is better to implement the algorithm as software by means of a microcomputer instead of as special-purpose hardware, thereby enabling determination of optimum specifications. Further, since the amount of processing required by determination of specifications is not large, a considerably inexpensive one-chip microcomputer sufficiently acts as the microcomputer 303, thereby preventing an increase in cost.

Procedures related to the processing performed by the microcomputer 303 and the position control circuit 301 are as follows:

(1) From the command generation circuit 23, the position control circuit 301 receives a backend parameter required for determining specifications for interlace printing and overlap printing, and the thus-received parameter is transferred to the microcomputer 303.

(2) From the command generation circuit 23, the position control circuit 301 receives a specification preparation request which is the first request in a page. In response to the request, the position control circuit 301 issues an interrupt request to the microcomputer 303. In response to the interrupt request, the microcomputer 303 determines a specification for one path on the basis of the backend parameter. This specification comprises a table (hereinafter referred to as an "interlace table") that specifies the vertical position of the path within a page (i.e., the amount of paper feed required to feed the paper to the path) and the number of raster and the dots of the raster (e.g., only odd-numbered dots or even-numbered dots) to be printed by the individual dot generation elements of the print head for one path.

(3) From the microcomputer 303, the position control circuit 301 receives the vertical position and the interlace table. In response to the request from the command generation circuit 23, the vertical position is transferred to the command generation circuit 23, and the interlace table is transferred to the memory control circuit 19. The memory control circuit 19 stores the interlace table into the memory device 21.

(4) The position control circuit 301 receives, from the memory control circuit 19, information regarding the interlace table related to the individual dot formation elements. In response to the raster data request from the command generation circuit 23, the position control circuit 301 gives the memory control circuit 19 a request for CMYK raster data regarding the dots specified by the information and receives the raster data regarding the dots. Null data regarding dots not to be printed are added to the raster data, and the thus-added raster data are transferred to the command generation circuit 23.

(5) For the second path or later, the position control circuit 301 spontaneously issues an interrupt request 111 to the microcomputer 303 and repeatedly performs the operations described in paragraphs (3) and (4).

Figure 7:
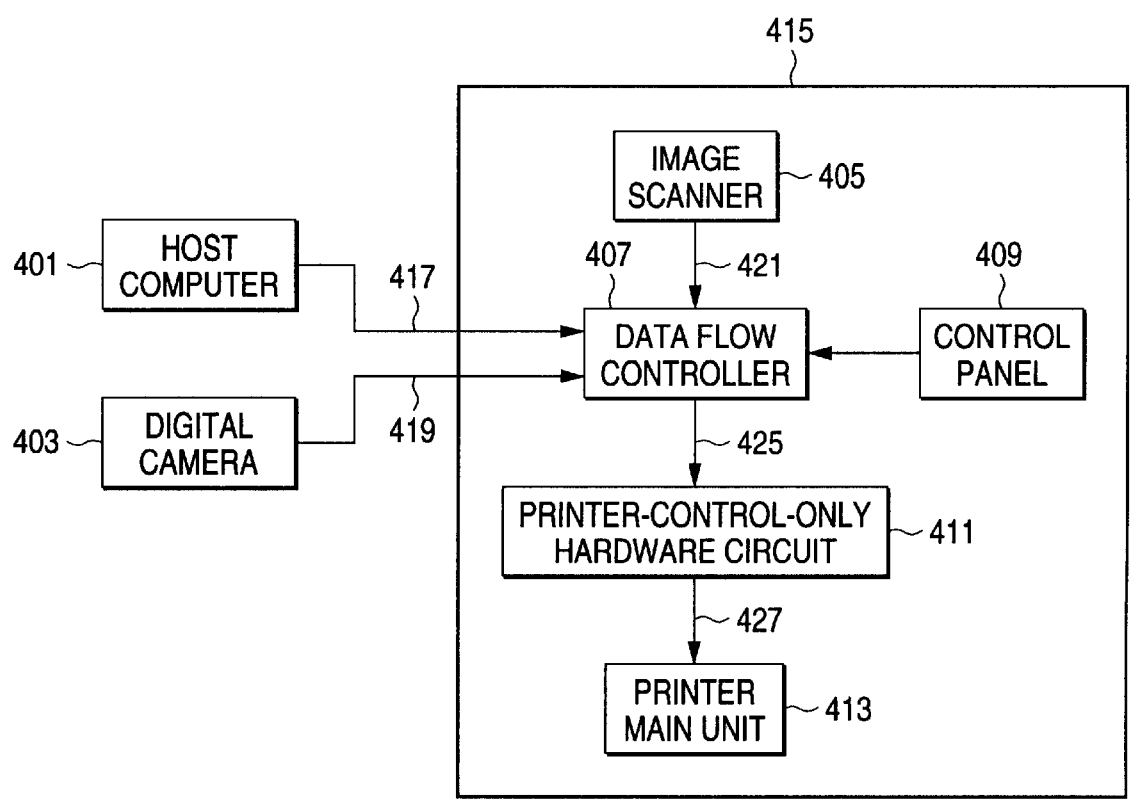
FIG. 7 is a block diagram showing the configuration of a print system according to still another embodiment of the present invention.

FIG. 7 shows the configuration of a print system according to still another embodiment of the present invention.

A data flow controller 407 is disposed upstream of a printer-control-only circuit (control circuit) 411. The data flow controller 407 can be connected to three types of host machines, such as a host computer 401, a digital camera 403, and an image scanner 405. In the present embodiment, the image scanner 405, the data flow controller 407, the control circuit 411, and a printer main unit 413 are housed in one housing as a single printer 415. The data flow controller 407 is also connected to a control panel 409 of the printer 415. The digital camera 405 is connected to the printer 415, only when necessary.

To carry out printing operations through use of the host computer 401, the host computer 401 generates a series of control circuit commands through use of an internal printer driver and sends the thus-generated commands to the data flow controller 407, as indicated by arrow 417. The data flow controller 407 transfers the control circuit commands in its present form to the control circuit 411 as indicated by arrow 4256. The control circuit 411 generates printer commands from the control circuit commands and sends the thus-generated commands to the printer main unit 413, as indicated arrow 427.

In principle, the image scanner 403 and the digital camera 405 output only full-color RGB data and have no function of generating the control circuit commands. Upon receipt from the control panel 409 a designation of mode in which printing is carried out through use of the image scanner 405 or the digital camera 403, the data flow control circuit 407 reads the full-color RGB raster image data from the image scanner 405 or the digital camera 403, as indicated by arrow 421 or 419. According to the printing conditions specified by the user by way of a control panel, the data flow controller 407 generates a series of control circuit commands to be used for printing RGB raster image and sends the thus-generated commands to the control circuit 411, as indicated by arrow 425. From the control circuit commands, the control circuit 411 generates the printer commands as mentioned previously, and sends the thus-generated printer commands to the printer main unit 413, as indicated by arrow 427.

In this way, printing can be carried out through use of any one of the host computer 401, the digital camera 403, and the image scanner 405.

As has been described above, the foregoing embodiments have been presented only for the purpose of illustration of the present invention and are not intended to limit the present invention solely to these embodiments. Therefore, the present invention can be implemented in various forms other than the foregoing embodiments. For example, in the previous embodiments, the control circuit performs manipulation of data, such as color conversion and halftoning of image data regarding a natural image and processing relating to interlace and overlap printing. However, such data manipulation is not mandatory. So long as the data manipulation performed by the printer driver or the printer during the course of converting the original image data generated by the host machine to the final image data used for printing by the printer is offloaded and placed on the control circuit, the processing speed of the print system is increased correspondingly. For example, the control circuit may undertake only halftoning of a natural image. Alternatively, the control circuit may undertake rasterization, color conversion, and halftoning of an entire image including a natural image, characters, and graphics.

What is claimed is:

1. A hardware circuit which is specifically designed for controlling a printer and is interposed between a host machine and a printer, said hardware circuit comprising:
   a command analysis circuit receiving a control circuit command from the host machine, determining whether the thus-received control circuit command is (i) a backend parameter setting command used for transmitting a backend parameter required for resetting the printer or (ii) a high-order raster image transmission command for transmitting high-order raster image data, and transmitting the backend parameter and the high-order raster image;
   an image data processing circuit receiving and converting the high-order raster image data transmitted from said command analysis circuit into low-order image data required by a printing mechanism of the printer, and transmitting the low-order image data;
   a memory control circuit (i) receiving and temporarily storing into a command buffer memory the backend parameter transmitted from said command analysis circuit, and (ii) receiving and temporarily storing into a data buffer memory the low-order raster image data transmitted from said image data processing circuit, wherein said memory control circuit (i) reads the backend parameter from the command buffer memory and transmits the thus-read backend parameter, and (ii) reads the low-order raster image data from the data buffer memory, and transmits the thus-read low-order raster image data; and
   a command generation circuit (i) generating a printer command for use in resetting the printer based on the backend parameter transmitted from said memory control circuit, and transmitting the thus-generated printer command to the printer, and (ii) generating a printer command for use in transmitting the low-order raster image to the printer based on the low-order raster image received from said memory control circuit, and transmitting the thus-generated printer command to the printer.

2. A printer control circuit according to claim 1, wherein the high-order raster image data are raster image data having high-value resolution, the low-order raster image data are raster image data having low-value resolution, and said image data processing circuit has a halftoning circuit which converts the high-value resolution raster image data into the low-value resolution raster image data.

3. A printer control circuit according to any one of claims 1 and 2, wherein the high-order raster image data are raster image data of host machine color system, the low-order raster image data are raster image data of printer color system, and said image data processing circuit has a color conversion circuit for converting the raster image data of host machine color system to the low-order raster image data.

4. A printer control circuit according to claim 1, wherein said command analysis circuit determines whether or not the received control circuit command is a low-order raster image command for use in transmitting the low-order raster image data and transmits the low-order raster image to said memory control circuit, and
   said memory control circuit temporarily stores the low-order raster image data received from the command analysis circuit in the same way as the low-order raster image received from said image data processing circuit and transmits the low-order raster image data to said command generation circuit.

5. A printer control circuit according to claim 4, wherein said memory control circuit stores, into said data buffer memory, the low-order raster image received from said command analysis circuit and-the tow-order raster image received from said image processing circuit, both of which relate to a single pixel, while these images are overlaid one on the other.

6. A printer control circuit according to claim 1, wherein said command analysis circuit determines whether or not the received control circuit command is an image conversion parameter transmission command used for transmitting an image conversion parameter required for resetting said image data processing circuit and transmits the image conversion parameter to said image data processing circuit, and
   said image processing circuit resets itself based on the image conversion parameter received from said command analysis circuit.

7. A printer control circuit according to claim 1, further comprising a position control circuit connected to both said memory control circuit and said command generation circuit, and
   wherein said command generation circuit supplies to said position control circuit the backend parameter received from said memory control circuit,
   said position control circuit determines, based on the backend parameter received from said command generation circuit, specifications for interlace or overlap printing, selects pixels to be printed by a print head of the printer in each path according to the thus-determined specifications, and makes a request to said memory control circuit for the low-order raster data relating to the thus-selected pixels,
   said memory control circuit reads, from said data buffer memory, the low-order raster data that relate to the selected pixels requested by said position control circuit and transmits the thus-read low-order raster data to said position control circuit, said position control circuit transmits to the command generation circuit the low-order raster data that relate to the selected pixels and that are received from the memory control circuit; and said command generation circuit generates, based on the low-order raster data that relate to the selected pixels and that are received from said position control circuit, a printer command used for transmitting to the printer the low-order raster image relating to the pixels.

8. A printer comprising:

a hardware circuit which is specifically designed for controlling a printer, receives a control circuit command from a host machine, and generates a printer command based on the control circuit command; and a printer main unit which performs printing operations based on the printer command generated by said hardware circuit, wherein said hardware circuit comprises:

a command analysis circuit receiving a control circuit command from the host machine, determining whether the thus-received control circuit command is (i) a backend parameter setting command used for transmitting a backend parameter required for resetting said printer main unit or (ii) a high-order raster image transmission command for transmitting high-order raster image data, and transmitting the backend parameter and the high-order raster image;

an image data processing circuit receiving and converting the high-order raster image data transmitted from said command analysis circuit into low-order image data required by a printing mechanism of said printer main unit, and transmitting the low-order image data;

a memory control circuit (i) receiving and temporarily storing into a command buffer memory the backend parameter transmitted from said command analysis circuit, and (ii) receiving and temporarily storing into a data buffer memory the low-order raster image data transmitted from said image data processing circuit, wherein said memory control circuit (i) reads the backend parameter from the command buffer memory and transmits the thus-read backend parameter, and (ii) reads the low-order raster image data from the data buffer memory, and transmits the thus-read low-order raster image data; and a command generation circuit (i) generating a printer command for use in resetting said printer main unit based on the backend parameter transmitted from said memory control circuit, and transmitting the thus-generated printer command to said printer main unit, and (ii) generating a printer command for use in transmitting the low-order raster image to said printer main unit based on the low-order raster image received from said memory control circuit, and transmitting the thus-generated printer command to said printer main unit.

9. A printer according to claim 8, wherein the high-order raster image data are raster image data having high-value resolution, the low-order raster image data are raster image data having low-value resolution, and said image data processing circuit has a halftoning circuit which converts the high-value resolution raster image data into the low-value resolution raster image data.

10. A printer according to any one of claims 8 and 9, wherein the high-order raster image data are raster image data of host machine color system, the low-order raster image data are raster image data of printer color system, and said image data processing circuit has a color conversion circuit for converting the raster image data of host machine color system to the low-order raster image data.

11. A printer according to claim 8, wherein said hardware circuit further comprises a position control circuit connected to both said memory control circuit and said command generation circuit, and wherein said command generation circuit supplies to said position control circuit the backend parameter received from said memory control circuit, said position control circuit determines, based on the backend parameter received from said command generation circuit, specifications for interlace or overlap printing, selects pixels to be printed by a print head of said printer main unit in each path according to the thus-determined specifications, and makes a request to said memory control circuit for the low-order raster data relating to the thus-selected pixels, said memory control circuit reads, from said data buffer memory, the low-order raster data that relate to the selected pixels requested by said position control circuit and transmits the thus-read low-order raster data to said position control circuit, said position control circuit transmits to the command generation circuit the low-order raster data that relate to the selected pixels and that are received from the memory control circuit; and said command generation circuit generates, based on the low-order raster data that relate to the selected pixels and that are received from said position control circuit, a printer command used for transmitting to said printer main unit the low-order raster image relating to the pixels.

12. A printer according to claim 11, further comprising a data flow controller disposed upstream of said hardware circuit, and wherein said data flow controller can be connected to both a first host machine having a function of generating the control circuit command and a second host machine not having the function of generating the control circuit command but having a function of outputting the high-order raster image data, receives the control circuit command from the first host machine when the first host machine is used and transmits the thus-received control circuit command to said hardware circuit, and receives the high-order raster image data from the second host machine when the second-host machine is used, generates a control circuit command required for printing the high-order raster image data, and transmits the thus-generated control circuit command to said hardware circuit.

13. A print system comprising:

a host machine which generates a control circuit command;

a hardware circuit which is specifically designed for controlling a printer, receives the control circuit command from said host machine, and generates a printer command based on the control circuit command; and a printer which performs printing operations based on the printer command generated by said hardware circuit, wherein said hardware circuit comprises:

a command analysis circuit receiving a control circuit command from the host machine, determining whether the thus-received control circuit command is (i) a backend parameter setting command used for transmitting a backend parameter required for resetting the printer or (ii) a high-order raster image transmission command for transmitting high-order raster image data, and transmitting the backend parameter and the high-order raster image;

an image data processing circuit receiving and converting the high-order raster image data transmitted from said command analysis circuit into low-order image data required by a printing mechanism of the printer, and transmitting the low-order image data;

a memory control circuit (i) receiving and temporarily storing into a command buffer memory the backend parameter transmitted from said command analysis circuit, and (ii) receiving and temporarily storing into a data buffer memory the low-order raster image data transmitted from said image data processing circuit, wherein said memory control circuit (i) reads the backend parameter from the command buffer memory and transmits the thus-read backend parameter, and (ii) reads the low-order raster image data from the data buffer memory, and transmits the thus-read low-order raster image data; and a command generation circuit (i) generating a printer command for use in resetting the printer based on the backend parameter transmitted from said memory control circuit, and transmitting the thus-generated printer command to the printer, and (ii) generating a printer command for use in transmitting the low-order raster image to the printer based on the low-order raster image received from said memory control circuit, and transmitting the thus-generated printer command to the printer.

14. A print system according to claim 13, wherein the high-order raster image data are raster image data having high-value resolution, the low-order raster image data are raster image data having low-value resolution, and said image data processing circuit has a halftoning circuit which converts the high-value resolution raster image data into the low-value resolution raster image data.

15. A print system according to any one of claims 13 and 14, wherein the high-order raster image data are raster image data of host machine color system, the low-order raster image data are raster image data of printer color system, and said image data processing circuit has a color conversion circuit for converting the raster image data of host machine color system to the low-order raster image data.

16. A print system according to claim 13, wherein said hardware circuit further comprises a position control circuit connected to both said memory control circuit and said command generation circuit, and wherein said command generation circuit supplies to said position control circuit the backend parameter received from said memory control circuit, said position control circuit determines, based on the backend parameter received from said command generation circuit, specifications for interlace or overlap printing, selects pixels to be printed by a print head of the printer in each path according to the thus-determined specifications, and makes a request to said memory control circuit for the low-order raster data relating to the thus-selected pixels, said memory control circuit reads, from said data buffer memory, the low-order raster data that relate to the selected pixels requested by said position control circuit and transmits the thus-read low-order raster data to said position control circuit, said position control circuit transmits to the command generation circuit the low-order raster data that relate to the selected pixels and that are received from the memory control circuit; and said command generation circuit generates, based on the low-order raster data that relate to the selected pixels and that are received from said position control circuit, a printer command used for transmitting to the printer the low-order raster image relating to the pixels.

17. A print system according to claim 13, wherein, when an image to be printed includes a natural image, characters and graphics, said host machine transmits, to said hardware circuit, the image relating to a natural image as the high-order raster image data, and the characters and graphics as the low-order raster image.

* * * * *